US011697446B2

(12) United States Patent
Schacht et al.

(10) Patent No.: US 11,697,446 B2
(45) Date of Patent: Jul. 11, 2023

(54) ADJUSTMENT DRIVE FOR A STEERING COLUMN, DRIVE UNIT FOR AN ADJUSTMENT DRIVE, MOTOR-ADJUSTABLE STEERING COLUMN FOR A MOTOR VEHICLE, AND METHOD FOR PRODUCING AN ADJUSTMENT DRIVE FOR A STEERING COLUMN

(71) Applicants: THYSSENKRUPP PRESTA AG, Eschen (LI); thyssenkrupp AG, Essen (DE)

(72) Inventors: Arne Schacht, Feldkirch (AT); Sebastian Huber, Göfis (AT); Jean-Pierre Specht, Haag (CH)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 261 days.

(21) Appl. No.: 16/605,244

(22) PCT Filed: Apr. 16, 2018

(86) PCT No.: PCT/EP2018/059684
§ 371 (c)(1),
(2) Date: Oct. 15, 2019

(87) PCT Pub. No.: WO2018/192880
PCT Pub. Date: Oct. 25, 2018

(65) Prior Publication Data
US 2021/0139067 A1    May 13, 2021

(30) Foreign Application Priority Data
Apr. 19, 2017    (DE) .................. 10 2017 206 551.6

(51) Int. Cl.
*B62D 1/181* (2006.01)
*B62D 1/185* (2006.01)
(Continued)

(52) U.S. Cl.
CPC ............. *B62D 1/181* (2013.01); *B62D 1/185* (2013.01); *F16H 25/20* (2013.01); *F16H 57/039* (2013.01);
(Continued)

(58) Field of Classification Search
CPC ... B62D 1/181; B62D 1/185; F16H 2025/209; F16H 25/20; F16H 2057/02021;
(Continued)

(56) References Cited

U.S. PATENT DOCUMENTS 3,820,415 A * 6/1974 Cass ...................... F16C 29/126
74/498
4,802,374 A * 2/1989 Hamelin ................ B60N 2/067
74/89.32
(Continued)

FOREIGN PATENT DOCUMENTS

| CN | 103129602 A | 6/2013 |
| CN | 204095869 U | 1/2015 |

(Continued)

OTHER PUBLICATIONS

English Translation of International Search Report issued in PCT/EP2018/059684, dated Jul. 4, 2018.

*Primary Examiner* — Jake Cook
*Assistant Examiner* — Gregory T Prather
(74) *Attorney, Agent, or Firm* — thyssenkrupp North America, LLC (57) ABSTRACT

An adjustment drive for a motor-adjustable steering column for a motor vehicle includes a drive unit having a transmission in which there is mounted a drive wheel. The drive
(Continued)

wheel can be driven to rotate about a drive axis and is in operative engagement with a transmission wheel which is mounted in the transmission so as to be rotatable about a transmission axis. The transmission has a drive module, which includes the drive wheel, and a transmission module, which includes the transmission wheel. The drive module and the transmission are connected to one another by a joining connection.

20 Claims, 4 Drawing Sheets

(51) Int. Cl.
    *F16H 25/20*     (2006.01)
    *F16H 57/022*     (2012.01)
    *F16H 57/039*     (2012.01)
    *F16H 57/12*     (2006.01)

(52) U.S. Cl.
    CPC .............. *F16H 2025/209* (2013.01); *F16H 2057/0228* (2013.01); *F16H 2057/125* (2013.01)

(58) Field of Classification Search
    CPC ....... F16H 2057/0227; F16H 2057/125; F16H 57/039; F16H 2057/0225; F16H 2057/0228

See application file for complete search history.

(56) References Cited

U.S. PATENT DOCUMENTS

| | | | |
|---|---|---|---|
| 2005/0252332 A1* | 11/2005 | Miltenberger | B62D 1/04 74/552 |
| 2011/0126653 A1* | 6/2011 | Kroner | F16H 57/039 29/527.1 |
| 2013/0126259 A1 | 5/2013 | Jung | |
| 2016/0053514 A1* | 2/2016 | Savage | E05G 1/08 312/326 |
| 2017/0120944 A1* | 5/2017 | Kato | B62D 1/181 |
| 2017/0217476 A1 | 8/2017 | Schlegel | |
| 2017/0363189 A1* | 12/2017 | Nunez | F16H 25/20 |

FOREIGN PATENT DOCUMENTS

| | | |
|---|---|---|
| CN | 204432743 U | 7/2015 |
| CN | 106536327 A | 3/2017 |
| DE | 20 2008 014 088 U | 3/2010 |
| DE | 10 2014 104 362 A | 10/2015 |
| EP | 1977866 A | 10/2008 |

* cited by examiner

ADJUSTMENT DRIVE FOR A STEERING COLUMN, DRIVE UNIT FOR AN ADJUSTMENT DRIVE, MOTOR-ADJUSTABLE STEERING COLUMN FOR A MOTOR VEHICLE, AND METHOD FOR PRODUCING AN ADJUSTMENT DRIVE FOR A STEERING COLUMN

CROSS REFERENCE TO RELATED APPLICATIONS

This application is a U.S. National Stage Entry of International Patent Application Serial Number PCT/EP2018/059684, filed Apr. 16, 2018, which claims priority to German Patent Application No. DE 10 2017 206 551.6, filed Apr. 19, 2017, the entire contents of both of which are incorporated herein by reference.

FIELD

The present disclosure generally relates an adjustment drive for a motor-adjustable steering column for a motor vehicle.

BACKGROUND

Steering columns for motor vehicles have a steering shaft with a steering spindle, at the rear end of which in the direction of travel, which faces the driver, a steering wheel is attached for introducing a steering command by the driver. The steering spindle is mounted so as to be rotatable about its longitudinal axis in an actuating unit which is held by a carrying unit on the vehicle body. A longitudinal adjustment can occur by virtue of the fact that the actuating unit is received in a telescopically displaceable manner in the direction of the longitudinal axis in a casing unit, also referred to as a guide box or box-section swinging fork, connected to the carrying unit. A height adjustment can be realized by virtue of the fact that the actuating unit or a casing unit receiving the latter is pivotably mounted on the carrying unit. The adjustment of the actuating unit in the longitudinal or height direction allows an ergonomically comfortable steering wheel position to be set relative to the driver position in an operating position, also referred to as a driving or actuating position, in which a manual steering intervention can occur.

It is known in the prior art, for the purpose of adjusting the actuating unit relative to the carrying unit, to provide a motor-operated adjustment drive having a drive unit which comprises an electric actuating motor which is connected—as a rule via a transmission—to a spindle drive which comprises a threaded spindle screwed into a spindle nut. By way of the drive unit, the threaded spindle and the spindle nut can be driven to rotate with respect to one another about an axis, namely the threaded spindle axis, with the result that, depending on the direction of rotation, the threaded spindle and the spindle nut can be moved translationally toward one another or away from one another in the direction of the threaded spindle axis. In one embodiment, the threaded spindle can be driven to rotate about its threaded spindle axis by the drive unit, which is fixedly connected to the actuating unit or the carrying unit, and engages in the spindle nut, which is fixedly attached in terms of rotation about the threaded spindle axis on the carrying unit or alternatively on the actuating unit. In the direction of the threaded spindle axis, the threaded spindle is supported on the carrying unit or the actuating unit, and the spindle nut is correspondingly supported on the actuating unit or alternatively on the carrying unit, with the result that a rotational drive of the threaded spindle brings about a translational adjustment of the carrying unit and actuating unit relative to one another in the direction of the threaded spindle axis. This embodiment is therefore also referred to as a rotational spindle drive.

In an alternative embodiment, the threaded spindle is nonrotatably coupled to the carrying unit or alternatively to the actuating unit with respect to rotation about its threaded spindle axis, and the spindle nut is correspondingly rotatably mounted on the actuating unit or alternatively on the carrying unit but is stationary in the direction of the threaded spindle axis. As in the first embodiment, the threaded spindle is supported on the carrying unit or on the actuating unit in the direction of the threaded spindle axis, and the spindle nut is correspondingly supported on the actuating unit or on the carrying unit, with the result that the threaded spindle can be displaced translationally in the direction of the threaded spindle axis by virtue of the spindle nut being driven to rotate by the drive unit about the threaded spindle axis. This embodiment is also referred to as a plunger spindle drive.

As in the first alternative, the rotational drive of the threaded spindle brings about a translational adjustment of the carrying unit and actuating unit relative to one another in the direction of the threaded spindle axis. In both embodiments, the spindle drive forms a motor-operated adjustment drive which acts between the carrying unit and actuating unit and by means of which the actuating unit can be adjusted for adjustment relative to the carrying unit.

In order to realize a longitudinal adjustment of the actuating unit in the direction of the longitudinal axis of the steering spindle, a spindle drive of an adjustment drive can be arranged between the actuating unit and a casing unit, also referred to as a guide box or box-section swinging fork, which receives the latter in an axially longitudinal displaceable manner and which is connected to the carrying unit, and wherein the threaded spindle axis can be oriented substantially parallel to the longitudinal axis. For the purpose of height adjustment, a spindle drive can be arranged between the carrying unit and an actuating unit which is mounted thereon so as to be pivotable in height or a casing unit, in which the actuating unit is received. A motor-operated longitudinal and height adjustment can be embodied individually or in combination on a steering column.

The drive of the spindle drive is effected by the drive unit via a transmission wheel which can be driven to rotate about its transmission axis, which is identical to the threaded spindle axis, which transmission wheel, depending on the embodiment of the spindle drive, is connected to the spindle nut or to the threaded spindle in a rotationally fixed manner. The transmission wheel comprises, for example, a toothing portion in the form of a spur gear with an outer circumferential toothing or worm toothing. The toothing portion is arranged in the axial direction between two end bearing surfaces which run around coaxially to the axis. The bearing surfaces are arranged in a bearing arrangement between corresponding outer bearing surfaces which are formed fixedly on the actuating unit or the carrying unit, for example in a transmission housing. As a result, the holding and adjusting forces which act on the transmission wheel in both axial directions of the threaded spindle axis and on the spindle drive are transmitted via the bearing surfaces to the outer bearing surfaces on the actuating unit or the carrying unit, and the transmission wheel is axially supported.

Such an adjustment drive is known from DE 10 2014 104 362 A1, for example. It comprises a drive unit having a transmission in which there is mounted a drive wheel which can be driven to rotate about a drive axis by an electric actuating motor and which forms a first transmission member. In the known example, this drive wheel is designed as a worm and is in operative engagement with a transmission wheel which is designed in the example as a corresponding worm wheel and forms a second transmission member which is mounted in the transmission so as to be rotatable about a transmission axis. The transmission wheel is connected, coaxially to the threaded spindle axis, either to the threaded spindle or the spindle nut depending on whether a rotational spindle drive or a plunger spindle drive is realized.

The drive wheel and the transmission wheel are rotatably mounted in bearings, as a rule in shaft bearings, which are mounted in a transmission housing. For a high running smoothness and a low degree of wear, it is required that the bearings are positioned with respect to one another as exactly as possible in the operative engagement of drive wheel and transmission wheel. In the case of toothed wheels, the distance must correspond as precisely as possible to the sum of the pitch circles of the toothings. Deviations which are caused, for example, by manufacturing tolerances cannot be compensated for by the positioning of the bearings, with the result that, for example, spring-loaded press-on devices are used by means of which a spring force is applied to the operative engagement of drive wheel and transmission wheel. A disadvantage with such press-on devices is that the required movable parts can result in a high manufacturing and assembly outlay and unfavorable, undesired natural frequencies can occur.

Thus a need exists for an adjustment drive which has improved operating properties with lower complexity, and a steering column having an improved adjustment drive.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to an adjustment drive for a motor-adjustable steering column for a motor vehicle, comprising a drive unit having a transmission in which there is mounted a drive wheel which can be driven to rotate about a drive axis and which is in operative engagement with a transmission wheel which is mounted in the transmission so as to be rotatable about a transmission axis. The invention also relates to a drive unit for such an adjustment drive, to a motor-adjustable steering column for a motor vehicle having an adjustment drive and to a method for producing an adjustment drive.

In some examples, an adjustment drive stated at the outset, the transmission is composed of a drive module, which comprises the drive wheel, and of a transmission module, which comprises the transmission wheel, wherein the drive module and the transmission module are connected to one another by a joining connection.

According to the invention, a modular design of the transmission is proposed in which the drive module and the transmission module form functional modules which are joined together to produce the operative engagement of drive wheel and transmission wheel. A particular advantage results from the fact that the two modules—drive module and transmission module—can at first be manufactured and provided separately. The separately present modules are configured such that they can be joined to one another and, for this purpose, comprise for example joining elements which correspond to one another, for example joining surfaces. To form the transmission, the modules are then connected to one another. Here, the modules are first of all positioned relative to one another such that the drive wheel of the drive module comes into operative engagement with the transmission wheel of the transmission module. An optimized orientation and alignment occurs during this positioning such that the transmission members, namely drive wheel and transmission wheel, are brought into engagement with one another while compensating for manufacturing-related dimensional tolerances. By virtue of the fact that this positioning of the transmission members can occur individually for each individual transmission, it is possible to take account of and compensate for even the slightest deviations of dimension and/or orientation of the transmission members and their bearings. If the optimal alignment has occurred, the drive module and transmission module are fixed to one another in a positionally accurate manner by the joining connection.

A particular advantage of a transmission produced according to the invention from modular assemblies is that even the slightest dimensional deviations, which can lead to undesired noise formation and increased wear particularly upon operative engagement of transmission wheels, can be effectively compensated for during the manufacture of the transmission when producing the joining connection. As a result, an improved running smoothness and a reduced degree of wear can be achieved. A further advantage is that the tolerance requirements placed on the individual transmission members—drive wheel, transmission wheel and their bearings—can be lower. As a result, a transmission built according to the invention from joined modular assemblies has better operating properties than conventional, integrated transmissions and requires a lower manufacturing and assembly outlay.

It is possible that the drive module comprises a drive part housing in which the drive wheel is mounted, and the transmission module comprises a transmission part housing in which the transmission wheel is mounted, and the drive part housing is connected to the transmission part housing via the joining connection. The two part housings—drive part housing and transmission part housing—each have at least one transmission member—drive wheel or transmission wheel—and their respective bearings for rotatable mounting about the drive or transmission axis. Appropriate cutouts or openings which correspond to one another in the part housings allow the drive wheel and transmission wheel to be brought into operative engagement with one another, for example through the mutual engagement of toothings. It is possible in this way for the drive and transmission axes defined by the bearings to be oriented individually relative to one another for each individual transmission by relative positioning of the drive part housing and transmission part housing and to arrange them at an optimal axis distance such that the operative engagement of drive wheel and transmission wheel is optimized. After joining the part housings, the drive wheel and transmission wheel are fixed in a positionally fixed manner such that the optimized operative engagement of the transmission members is ensured over the operating life of the transmission.

The part housings having the bearings and transmission members arranged therein can be manufactured and provided as modular assemblies which at least partially form the drive module and the transmission module. For example, a drive part housing can comprise a drive wheel, for example in the form of a worm, and a drive wheel bearing, and a transmission part housing can comprise a transmission wheel, for example in the form of a worm wheel, and a transmission wheel bearing. By virtue of the positionally accurate joining of the drive part housing and transmission part housing to form the transmission housing, the drive wheel and the transmission wheel are optimally aligned with one another in operative engagement.

In order to produce the operative connection between the transmission members when connecting the part housings, there can be provision that the drive part housing comprises, in the region of the drive wheel, and the transmission part housing comprises, in the region of the transmission wheel, an open engagement region, wherein the drive wheel and the transmission wheel are in operative engagement with one another through the engagement region. The drive part housing has an engagement region open toward the transmission part housing, and vice versa, that is to say that, in the joined-together state, there is an open passage between the part housings in the engagement region. For example, the drive wheel designed as a worm projects from the drive part housing in the engagement region and plunges through the engagement region into the transmission part housing, where it meshes with the toothing of the transmission wheel designed as a worm wheel.

It is advantageous that the drive module and the transmission module have corresponding joining elements. The drive module and the transmission module are connected to one another and mutually fixed at the joining elements. The joining elements can comprise, for example, form-fitting elements which allow an unambiguous orientation of the modules in one or more spatial directions. Furthermore, it is advantageous that the joining elements offer degrees of freedom with respect to the relative positioning, for example by means of guide surfaces and/or edges which allow guidance or support in at least one spatial direction while, for example, a relative movement or displacement of the drive module and transmission module is possible in at least one other spatial direction, in order for example to adjust the axis distance between the drive wheel and transmission wheel.

The joining elements can be designed for specific types of joining connections in terms of arrangement, shaping, material, surface structure and the like. For example, welding preparations with material arrangements for the optimized production of a welding connection can be provided, or structured surfaces for the production of integrally bonded connections by means of adhesive bonding or brazing can be provided, or receptacles for connecting elements such as screws, rivets or the like can be provided. The joining elements are preferably arranged on the drive part housing and/or the transmission part housing and allow the positioning and joining together of the drive module and transmission module.

The joining connection can comprise a form-fitting and/or force-fitting and/or integrally bonded connection. A nonreleasable connection can occur, for example in an integrally bonded manner by welding, ultrasonic welding or adhesive bonding, or else in a form-fitting manner by riveting, seaming, flanging, clinching or caulking. Additionally or alternatively, a releasable connection can occur, for example by means of screwing.

An advantageous embodiment provides that the transmission part housing comprises at least one preferably cylindrical tubular portion which is coaxial to the transmission axis and which is encompassed by the drive part housing at least over a circumferential subregion. The transmission wheel is mounted coaxially in the tubular portion and, depending on the embodiment of the adjustment drive, is connected to the threaded spindle or the spindle nut in a rotationally fixed manner, wherein the transmission axis coincides with the threaded spindle axis. The tubular portion preferably comprises, in the region of the transmission wheel, an engagement region which is designed as an engagement opening which in each case extends over a portion in the circumferential and axial direction. The drive part housing is adapted to the tubular portion such that the latter is at least partially received over a circumferential portion of its outer circumference. For example, the tubular portion can be cylindrical in form, and the drive part housing can comprise a hollow cylindrical connecting portion which corresponds in diameter, with the result that a kind of channel-shaped connecting portion, which is maximally semicircular in circumferential cross section, is formed in which the tubular portion can be received in a form-fitting manner. By virtue of the form-fit there can occur a defined orientation of the two part housings with respect to the transmission axis, while the distance radially from the transmission axis can be freely predetermined, with the result that, according to the invention, the relative distance between the drive axis and transmission axis can be individually adjusted to compensate for tolerances. In the optimal position in which the drive wheel and transmission wheel are in optimal operative engagement, the drive part housing seated on the tubular portion is fixed by producing the joining connection between the part housings.

There can be provision that the drive wheel is coupled coaxially to the motor shaft of an actuating motor, and the transmission wheel is connected to a threaded spindle or a spindle nut. The drive wheel can be arranged, for example, on the motor shaft, or on a driveshaft coupled to the motor shaft. The motor shaft or the driveshaft can be mounted, on the motor side, in the motor or in at least one bearing in the drive part housing and, at its end remote from the motor, in a bearing in the drive part housing, with the result that a defined orientation occurs in the drive module.

The actuating motor can be connected to the drive module in a positionally fixed manner, preferably by the actuating motor being attached to the drive part housing, for example by means of a flanged connection.

One embodiment of the invention provides that the drive axis and the transmission axis are substantially perpendicular to one another and have a distance from one another which is predetermined by the axis distance between the drive wheel and transmission wheel in operative engagement. Substantially perpendicular is to be understood as meaning a deviation of up to ±10° from an ideal perpendicular arrangement. In the case of toothed wheels, this is the sum of the pitch circle radii. In the case of an embodiment as a worm wheel transmission, the axis distance is determined from the pitch circle radius of the worm wheel and the reference circle radius of the worm. By virtue of the fact that the drive axis is defined by a bearing arranged in the drive module, and the transmission axis is defined by a bearing arranged in the transmission module, it is possible by means of the joining connection of the modules according to the invention for the drive wheel and transmission wheel to be fixed in individually optimized operative engagement with optimal orientation.

The above-stated embodiment can be realized by the drive wheel being designed as a worm and the transmission wheel being designed as a worm wheel. The worm is preferably mounted as a constituent part of the drive module in a drive part housing. The mounting can be effected in at least one shaft bearing arranged in the drive part housing, and/or in a motor bearing of the actuating motor which is connected to the drive part housing. The worm wheel is mounted in the transmission part housing. The drive part housing and transmission part housing have corresponding engagement openings through which the worm can be brought into meshing operative engagement with the worm wheel.

The invention comprises a drive unit for an adjustment drive, having a transmission in which there is mounted a drive wheel which can be driven to rotate about a drive axis and which is in operative engagement with a transmission wheel which is mounted in the transmission so as to be rotatable about a transmission axis. According to the invention, the transmission is composed of a drive module, which comprises the drive wheel, and of a transmission module, which comprises the transmission wheel, wherein the drive module and the transmission module are connected to one another by a joining connection. The underlying object is achieved by using such a drive unit in an adjustment drive.

The drive unit can comprise the features described above for the adjustment unit according to the invention.

The invention further relates to a motor-adjustable steering column for a motor vehicle, having a carrying unit which can be attached to a vehicle body and by which there is held an actuating unit in which a steering spindle is mounted so as to be rotatable about a longitudinal axis, and having an adjustment drive which is connected to the carrying unit and to the actuating unit and by which the actuating unit can be adjusted relative to the carrying unit, wherein the adjustment drive comprises a threaded spindle which engages in a spindle nut, and wherein the adjustment drive comprises a drive unit having a transmission in which there is mounted a drive wheel which can be driven to rotate about a drive axis and which is in operative engagement with a transmission wheel which is mounted in the transmission so as to be rotatable about a transmission axis and is connected to the threaded spindle or the spindle nut. According to the invention, there is provision that the transmission is composed of a drive module, which comprises the drive wheel, and of a transmission module, which comprises the transmission wheel, wherein the drive module and the transmission module are connected to one another by a joining connection.

The adjustment drive can be configured as described above in developments of the invention.

An adjustment drive according to the invention for a motor-adjustable steering column for a motor vehicle can be produced in a method according to the invention comprising the following steps:

providing a drive module which comprises a drive part housing having a drive wheel which is mounted therein so as to be rotatable about a drive axis, providing a transmission module which comprises a transmission part housing having a transmission wheel which is mounted therein so as to be rotatable about a transmission axis, positioning the drive module and transmission module relative to one another in the engagement position (operative position) such that the drive wheel and transmission wheel are brought into operative engagement, fixing/joining together the drive module and transmission module in the engagement position.

A drive module can at first be manufactured separately, wherein the drive wheel, for example a worm, is positioned in a defined manner, for example by means of one or more bearings of the drive shaft, here the worm shaft. The mounting can occur in the drive part housing, preferably, as seen from the actuating motor, on the shaft end remote from the motor, and, on the end close to the motor, likewise in a bearing in the drive part housing, or in a motor bearing of the actuating motor which is fixed to the drive part housing. The transmission wheel is mounted in the transmission part housing so as to be rotatable about the transmission axis which coincides with the threaded spindle axis.

In the next manufacturing step, the drive part housing and the transmission part housing are positioned relative to one another in such a way that the drive wheel and the transmission wheel come into operative engagement with one another, wherein, in the stated example, the worm meshes with the worm wheel. Here, the axis distance between drive axis and transmission axis is set to optimal transmission backlash, wherein manufacturing and dimensional tolerances of the drive wheel and transmission wheel and of the bearings can be compensated for. The distance can be optimized for example in that the backlash between the tooth flanks is monitored during the relative positioning of the drive part housing and transmission part housing, and/or the force on the toothed engagement is measured in the direction of the axis distance. There thus occurs, for each individual transmission during manufacturing, an individual positioning of the drive wheel with respect to the transmission wheel in which individual tolerances can be taken into account and compensated for. It is also conceivable and possible, when positioning the drive part housing and the transmission part housing with respect to one another, to drive the drive wheel and transmission wheel and to determine the efficiency, wherein the positioning comprises an optimal position when the efficiency has reached the highest value. In this position, the drive part housing and the transmission part housing are then fixed relative to one another. Furthermore, there can additionally or alternatively be provision that the structure-borne noise is measured during the positioning and the operation of the transmission. If the structure-borne noise lies below a predetermined threshold value, the drive part housing and transmission part housing are fixed to one another. A particularly low-noise operation can thus be achieved.

If the optimal relative positioning of the drive wheel and transmission wheel has been determined and set, the drive module and transmission module are fixed to one another by producing the joining connection between the drive part housing and transmission part housing. As a result, the drive wheel and transmission wheel are fixed at an optimal axis distance and correspondingly in optimal operative engagement. A low-noise and low-wear running of the transmission over its service life is thereby ensured without additional devices for compensating for dimensional tolerances being required.

The joining connection can be achieved, for example, by a welding, for example as an ultrasonic welding connection, of corresponding joining elements on the drive part housing and transmission part housing. This produces a nonreleasable, integrally bonded connection. The production of a form-fitting, nonreleasable connection can also be achieved by material deformation, for example by stamping, caulking, pressing, seaming or the like. Alternatively or additionally, releasable or nonreleasable fastening elements, for example screws or rivets, can be used between the drive part housing and transmission part housing.

The method according to the invention makes it possible to produce an adjustment drive having the above-described features and a drive unit for such an adjustment drive and a steering column comprising at least one such adjustment drive.

Figure 1:
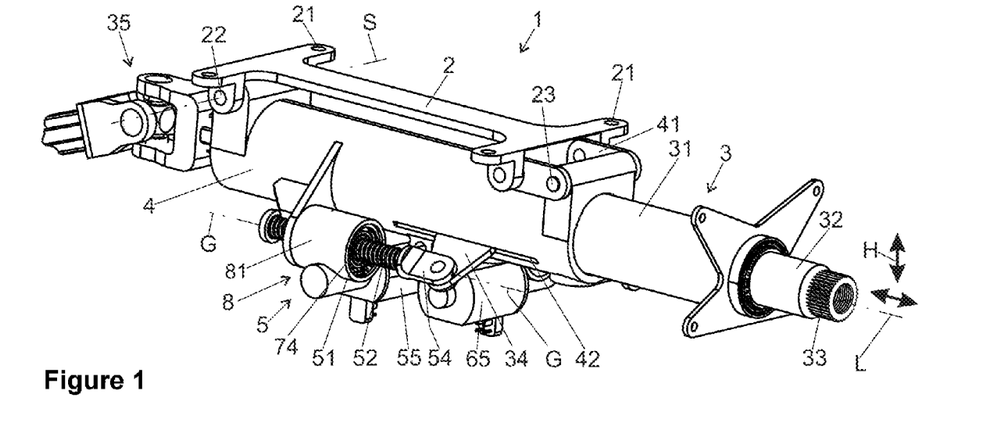
FIG. 1 is a schematic perspective view of a steering column.
Figure 2:
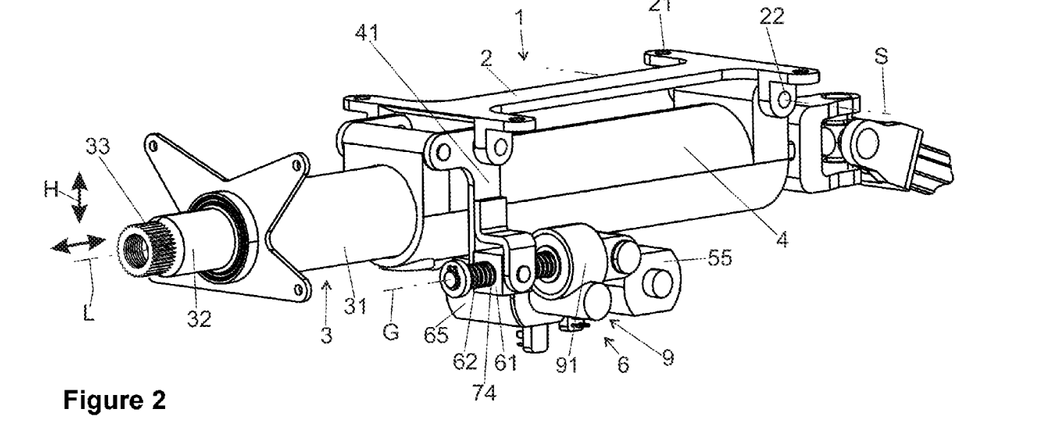
FIG. 2 is a further perspective view of the steering column as shown in FIG. 1 from another angle of view.

FIG. 1 shows, from obliquely top right, a steering column 1 according to the invention in a schematic perspective view of the rear end with respect to the direction of travel of a vehicle (not shown), where a steering wheel (not shown here) is held in the operating region. FIG. 2 shows the steering column 1 in a view from the opposite side, that is to say as seen from top right.

The steering column 1 comprises a carrying unit 2 which is designed as a bracket which comprises fastening means 21 in the form of fastening holes for attachment to a vehicle body (not shown). The carrying unit 2 holds an actuating unit 3 which is received in a casing unit 4—also referred to as a guide box or box-section swinging fork.

The actuating unit 3 comprises a casing tube 31 in which a steering spindle 32 is mounted so as to be rotatable about a longitudinal axis L, said steering spindle extending axially in the longitudinal direction, that is to say in the direction of the longitudinal axis L. At the rear end, a fastening portion 33 to which a steering wheel (not shown) can be attached is formed on the steering spindle 32. At the front end, the steering spindle 32 is connected to a fork of a universal joint 35 in a torque-transmitting manner.

In order to realize a longitudinal adjustment, the actuating unit 3 is received in the casing unit 4 so as to be telescopically displaceable in the direction of the longitudinal axis L so that the steering wheel connected to the steering spindle 32 can be positioned forward and backward in the longitudinal direction relative to the carrying unit 2, as indicated by the double arrow parallel to the longitudinal axis L.

The casing unit 4 is mounted in its front end region in a pivot bearing 22 on the carrying unit 2 so as to be pivotable about a horizontal pivot axis S situated transversely to the longitudinal axis L. In the rear region, the casing unit 4 is connected to the carrying unit 2 via a rotatable actuating lever 41. As a result of a rotational movement of the actuating lever 41 by means of an illustrated actuating drive 6 (see FIG. 2), the casing unit 4 can be pivoted relative to the carrying unit 2 about the pivot axis S which lies horizontally in the installed state, whereby it is possible to carry out an adjustment of a steering wheel attached to the fastening portion 33 in the vertical direction H, which is indicated by the double arrow.

A first adjustment drive 5 for longitudinally adjusting the actuating unit 3 relative to the casing unit 4 in the direction of the longitudinal axis L comprises a spindle drive having a spindle nut 51 with an internal thread 74 in which a threaded spindle 52 extending along a threaded spindle axis G engages, that is to say is screwed by its external thread into the corresponding internal thread 74 of the spindle nut 51. The threaded spindle axis G of the threaded spindle 52 extends substantially parallel to the longitudinal axis L.

The spindle nut 51 is mounted in a transmission housing 81 so as to be rotatable about the threaded spindle axis G in a transmission 8, which transmission housing is fixedly connected to the casing unit 4. In the direction of the threaded spindle axis G, which is also referred to below with the same meaning as transmission axis G, the spindle nut 51 is supported axially on the casing unit 4 via the transmission housing 81, as will be explained in more detail below.

The threaded spindle 52 is connected by way of a fastening element 54 formed on its rear end to the actuating unit 3 via a transmission element 34, specifically fixedly in the direction of the threaded spindle axis G or the longitudinal axis L and fixedly with respect to rotation about the threaded spindle axis G. A so-called plunging spindle drive is realized by the rotationally drivable spindle nut 51 and the threaded spindle 52 which is fixed with respect to rotation.

The transmission element 34 extends from the actuating unit 3 through a slot-shaped through-opening 42 in the casing unit 4. To adjust the steering column 1 in the longitudinal direction, the transmission element 34 can be moved along freely in the longitudinal direction in the through-opening 42.

The adjustment drive 5 comprises an electric actuating motor 55 by which the spindle nut 51 can be driven to rotate with respect to the threaded spindle axis G relative to the fixed threaded spindle 52. It is thus possible—depending on the direction of rotation of the actuating motor 55—for the threaded spindle 52 to be displaced in the direction of the axis G translationally relative to the spindle nut 51, with the result that correspondingly the actuating device 3 connected to the threaded spindle 52 is adjusted relative to the casing unit 4 connected to the spindle nut 51 in the direction of the longitudinal axis L. The drive of the spindle nut 51 will be explained in more detail below.

In FIG. 2, which shows a perspective view of the steering column 1 from the side situated to the rear in FIG. 1, it can be seen how a second adjustment drive 6 for adjustment in the vertical direction H is attached to the steering column 1. This adjustment drive 6 comprises a spindle nut 61 in whose internal thread 74 a threaded spindle 62 engages along a threaded spindle axis G. The adjustment drive comprises a transmission 9 in which the threaded spindle 62 is mounted so as to be rotatable in a transmission housing 91, which is fastened to the casing unit 4, about the threaded spindle axis G, which is referred to with the same meaning as a transmission axis G, and is axially supported, in the direction of the threaded spindle axis G, on the casing unit 4. The threaded spindle 62 can be selectively driven to rotate about the threaded spindle axis G in both directions of rotation by an electric actuating motor 65.

The spindle nut 61 is attached fixedly with respect to a rotation about the threaded spindle axis G on one end of the two-arm actuating lever 41, which is mounted on the carrying unit 22 so as to be rotatable about a pivot bearing 23, and its other arm is connected by the other end to the casing unit 4.

By rotating the threaded spindle 61 it is possible—depending on the direction of rotation of the actuating motor 65—for the spindle nut 61 to be displaced translationally relative to the threaded spindle 62 in the direction of the threaded spindle axis G, with the result that correspondingly the casing unit 4 connected to the spindle nut 61 via the actuating lever 41, together with the actuating device 3 received in said casing unit, can be adjusted up or down relative to the carrying unit 2 in the vertical direction H, as indicated by the double arrow.

A so-called rotational spindle drive is realized by the rotationally drivable threaded spindle 62 and the spindle nut 61 which is fixed with respect to rotation.

The invention relates to the design of a transmission housing 8 or 9, the latter being substantially only distinguished in that, in the transmission housing 9, it is the threaded spindle 52 which is mounted so as to be rotatable about the respective threaded spindle axis G and is mounted fixedly in the axial direction, and, in the transmission housing 8, it is the spindle nut 61. In the following, FIGS. 3 to 9 will be used to explain exemplary embodiments of the transmission housing 9 of the adjustment drive 6 designed as a rotational spindle drive, wherein the features can be transferred to the embodiment of a transmission housing 8 for an adjustment drive 5 designed as a plunging spindle drive by virtue of the fact that, instead of the threaded spindle 62, the spindle nut 51 is arranged in a rotationally drivable manner.

Figure 3:
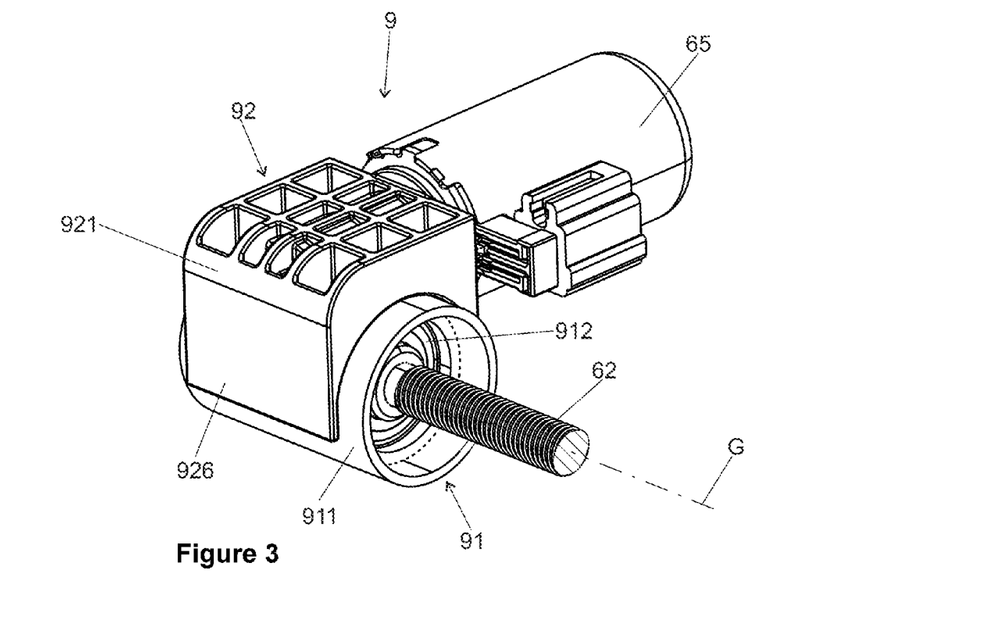
FIG. 3 is a perspective view of a drive unit of an adjustment drive of the steering column as shown in FIGS. 1 and 2.
Figure 4:
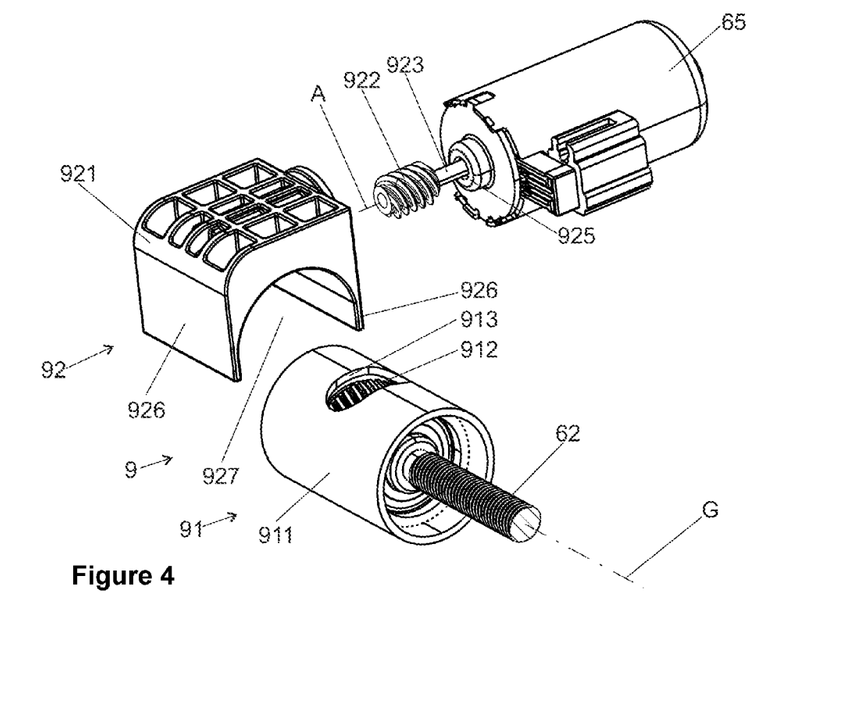
FIG. 4 is a perspective view of the drive unit as shown in FIG. 3 in an exploded state.

FIG. 3 shows the drive unit released from the adjustment drive 6 in the assembled state. In FIG. 4, the key functional parts are shown apart from one another in an exploded illustration. The arrangement of the individual parts explained in more detail below can be gathered from the sectional illustrations in FIGS. 5, 6 and 7.

The transmission housing 91 of the transmission 9 is assembled according to the invention from a drive module 92 and a transmission module 91.

The drive module 92 comprises a drive part housing 921 in which there is rotatably mounted a drive wheel which is designed as a worm 922 and which is fastened to a driveshaft 923 which extends in the direction of a drive axis A. The worm 922 is preferably fastened to the driveshaft 923 by means of a transverse interference fit. This offers the advantage that there is no need for high pressing-on forces as in the case of a longitudinal interference fit. The worm 922 is preferably inductively heated before the joining operation and then pushed onto the driveshaft 923 with little application of force, with the result that the worm 922 is shrunk on the driveshaft 923 after cooling. The driveshaft 923 can be rotationally driven by the actuating motor 65, with the motor shaft thereof being able to form the driveshaft 923 or being coupled thereto at least in a torque-transmitting manner. The actuating motor 65 is flanged onto the drive part housing 921 and connected thereto, wherein the driveshaft 923 is rotatably mounted, at its end remote from the motor, in a bearing 924 in the drive part housing 921, and, in its region close to the motor, in a motor bearing 925 which, together with the actuating motor 65, is likewise fixed in the drive part housing 921.

The transmission module 91 comprises a tubular transmission part housing 911 which is formed in a hollow cylindrical manner coaxially to the transmission axis G and in which a transmission wheel designed as a worm wheel 912 is mounted so as to be rotatable about the transmission axis G. The worm wheel 912 is connected to the threaded spindle 62 in a rotationally fixed manner. As can be seen in FIG. 4, the transmission part housing 911 comprises an engagement opening 913 in the region of the worm wheel 912.

The drive part housing 921 comprises fastening portions 926 which are arranged on an at least partially hollow cylindrical receiving region 927 and are situated opposite to one another with respect to the transmission axis G. The receiving region 927 has approximately the shape of a channel which extends in the direction of the transmission axis G and which has a semicircular open cross section which is configured for the form-fitting reception of the outwardly cylindrical transmission part housing 911.

In order to produce a transmission 9, a drive module 92 is made available by virtue of the fact that the worm 922 is inserted into the drive part housing 921, said worm being mounted so as to be rotatable about the drive axis A by way of the driveshaft 923 in the bearing 924 in the drive part housing 921. The driveshaft 923 is coupled to the motor shaft of the actuating motor 65, which is likewise connected to the drive module 92.

Also provided is a transmission module 91, wherein the worm wheel 912 connected to the threaded spindle 62 is mounted in the transmission part housing 911 so as to be rotatable about the transmission axis G, which is identical to the threaded spindle axis G.

The drive module 92 and the transmission module 91 are positioned relative to one another in such a way that the transmission part housing 911 is received between the fastening portions 926 of the drive part housing 921. The transmission part housing 911 is now positioned transversely to the transmission axis G relative to the drive part housing 921 until the engagement distance E, also referred to as axis distance E, between the drive axis A and the transmission axis G is set, wherein the worm 922 plunges (protrudes) through the engagement opening 913 and engages in the worm wheel 912, and the optimal engagement position of the worm 922 and worm wheel 912 is produced.

In the optimal engagement position with axis distance E, the drive module 92 is fixed to the transmission module 91 by producing a joining connection between the drive part housing 921 and the transmission part housing 911.

Figure 5:
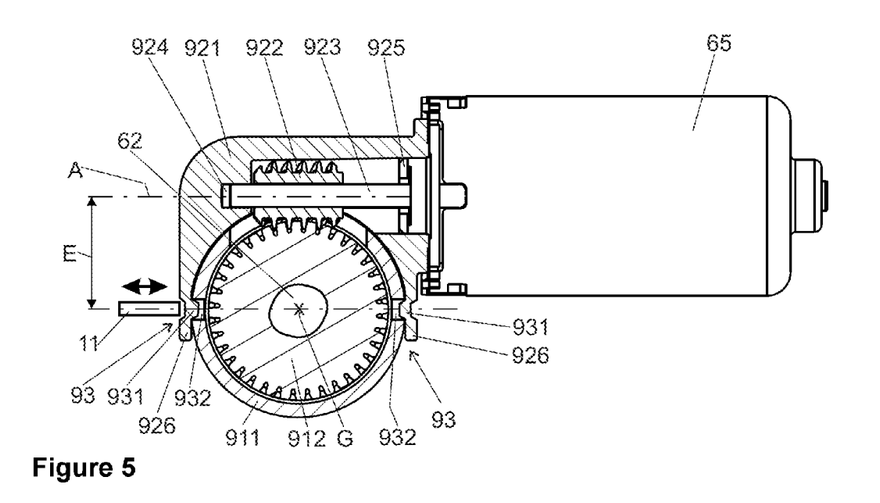
FIG. 5 is a cross-sectional view through a drive unit as shown in FIG. 2 in a first aspect.

In the embodiment shown in FIG. 5, joining connections 93 take the form of caulking connections. In order to produce a caulking connection, a pin-shaped tool 11 is used to plastically form in each case an embossment 931 from outside into the fastening portion 926 by means of a linear movement indicated by the double arrow. The embossment 931 projects inwardly in a form-fitting manner and engages in a form-fitting manner in a corresponding cutout 932 in the outer side of the transmission part housing 911. By virtue of the fact that this transmission part housing 911 is for its part received in a form-fitting manner between the fastening portions 926 in a form-fitting manner in the concave receiving region 927 of the drive part housing 921, it is permanently fixed in a form-fitting manner by the introduction of the embossments 931. As a result, the set axis distance E is likewise fixed. For the embodiment illustrated in FIG. 5, the drive part housing 921 is preferably created from a metallic material.

Figure 9:
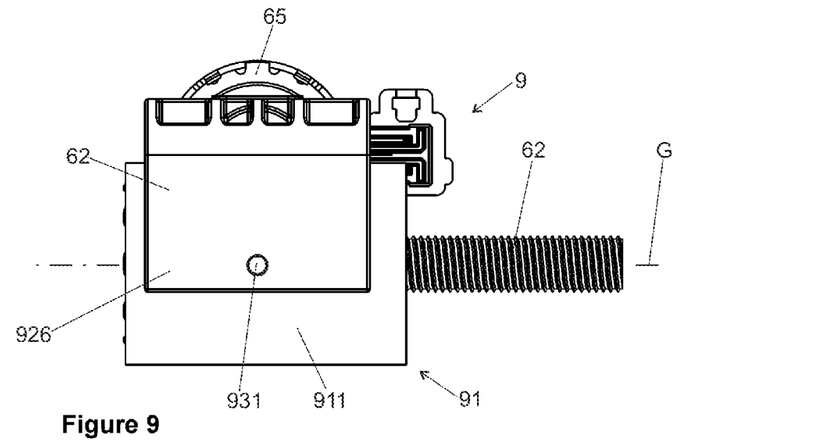
FIG. 9 is a side view of the drive unit as shown in FIG. 5 in a first variant.
Figure 10:
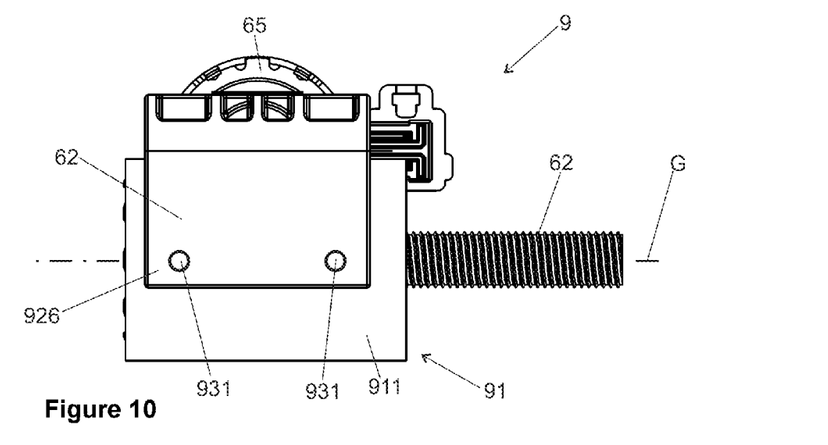
FIG. 10 is a side view of the drive unit as shown in FIG. 5 in a second variant.

FIG. 9 is a side view showing the arrangement of an embossment 931 in a fastening portion 926 of the drive part housing 921. An alternative arrangement of a plurality of embossments 931 is shown in FIG. 10. This has the further advantage that, where appropriate, a tilting of the transmission axis G relative to the drive module 92 that is introduced for tolerance compensation can be set and fixed.

Figure 6:
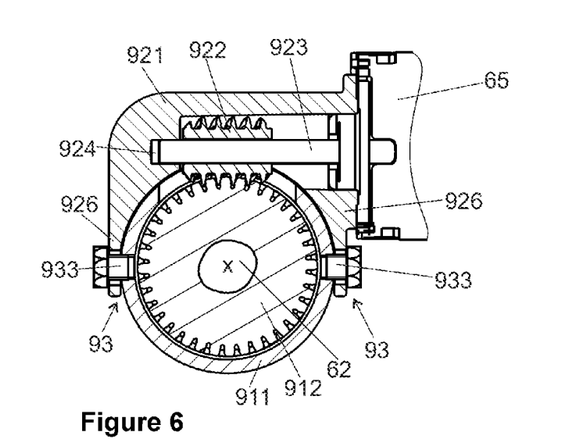
FIG. 6 is a cross-sectional view through a drive unit as shown in FIG. 2 in a second aspect.

A further possibility of joining connections 93 is shown in FIG. 6. In the latter, the drive part housing 921 is connected to the transmission part housing 911 by means of screws 933 which are guided through the fastening portions 926. The screws 933 make it possible to form a releasable connection which, for example, allows readjustment of the axis distance E.

Figure 7:
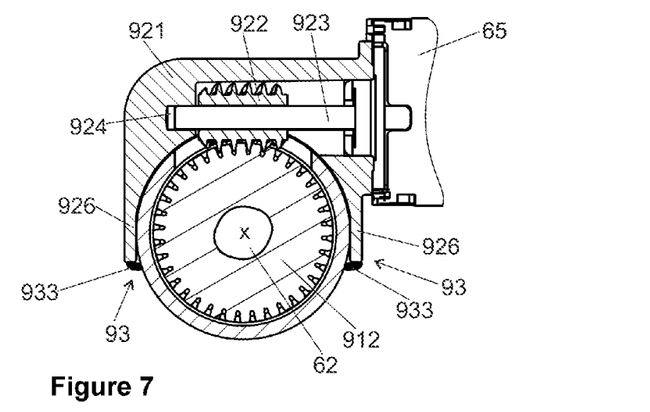
FIG. 7 is a cross-sectional view through a drive unit as shown in FIG. 2 in a third aspect.

As shown in FIG. 7, the joining connections 93 can be realized by welding seams 934 which can also be configured as spot welds. This integrally bonded nonreleasable connection can be efficiently produced and is precise and reliable. An integrally bonded connection can be produced in a particularly efficient manner by means of a laser welding process.

Figure 8:
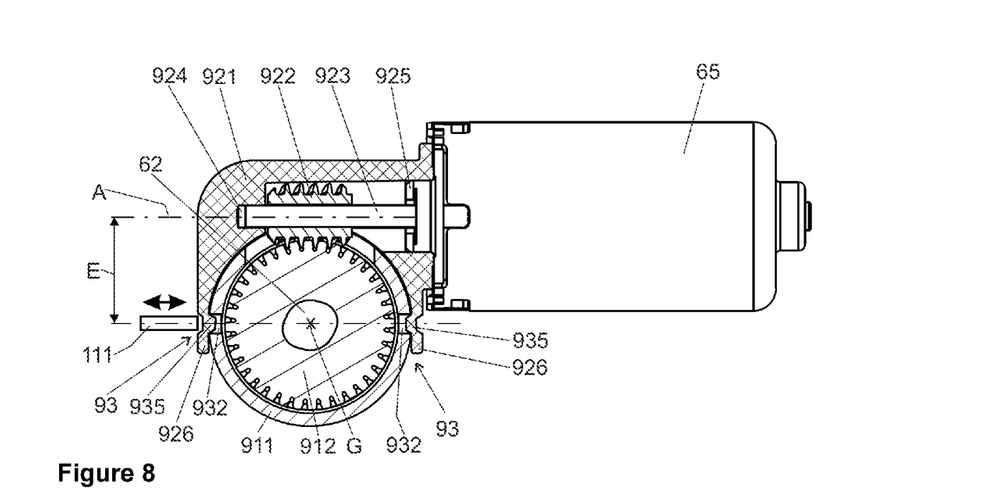
FIG. 8 is a cross-sectional view through a drive unit as shown in FIG. 2 in a fourth aspect.

In the fourth embodiment shown in FIG. 8, joining connections 93 take the form of ultrasonic welding connections. In order to produce a form-fitting connection, a sonotrode 111 is used to form in each case a formation 935 from outside into the fastening portion 926 by local thermal melting of the drive part housing 921 created from plastic. After solidification of the locally melted plastic, there is a form-fitting connection between the transmission part housing 911 and the drive part housing 921. The formation 935 projects inwardly in a form-fitting manner and engages in a form-fitting manner in a corresponding cutout 932 in the outer side of the transmission part housing 911. By virtue of the fact that this transmission part housing 911 is for its part received in a form-fitting manner between the fastening portions 926 in a form-fitting manner in the concave receiving region 927 of the drive part housing 921, it is permanently fixed in a form-fitting manner by the introduction of the formations 935. As a result, the set axis distance E is likewise fixed.

LIST OF REFERENCE SIGNS

1 Steering column
11 Tool
111 Sonotrode
2 Carrying unit
21 Fastening means
22, 23 Pivot bearing
3 Actuating unit
31 Casing tube
32 Steering spindle
33 Fastening portion
34 Transmission element
4 Casing unit
41 Actuating lever
42 Through-opening
5, 6 Adjustment drive
51, 61 Spindle nut
52, 62 Threaded spindle
54 Fastening element
55, 65 Actuating motor
56, 66 Worm
7 Transmission wheel
71 Core element
72 Toothing (worm toothing)
73 Connecting portion
74 Internal thread
8, 9 Transmission
81, 91 Transmission housing
91 Transmission module
911 Transmission part housing
912 Worm wheel
913 Engagement opening
92 Drive module
921 Drive part housing
922 Worm
923 Driveshaft
924 Bearing
925 Bearing
926 Fastening portions
927 Receiving region
93 Joining connection
931 Embossment
932 Cutout
933 Screw
934 Welding seam
935 Formation
L Longitudinal axis
H Vertical direction
G Threaded spindle axis (transmission axis)
A Drive axis
E Engagement distance

What is claimed is:

1. An adjustment drive for a motor-adjustable steering column for a motor vehicle, comprising:
a drive unit having a transmission;
a drive wheel mounted in the transmission and which when driven rotates about a drive axis; and
a transmission wheel in operative engagement with the drive wheel, the transmission wheel rotatably mounted in the transmission about a transmission axis,
wherein the transmission is composed of a drive module, which comprises the drive wheel, and a transmission module, which comprises the transmission wheel, wherein the drive module and the transmission module are connected to one another by a joining connection that is non-releasable,
wherein the drive module comprises a drive part housing in which the drive wheel is mounted, wherein the transmission module comprises a transmission part housing in which the transmission wheel is mounted, wherein the drive part housing is connected to the transmission part housing via the joining connection,
wherein the transmission part housing comprises an exterior tubular portion that is coaxial to the transmission axis and that is partially surrounded by the drive part housing,
wherein the drive part housing and the exterior tubular portion of the transmission part housing are sized and shaped to permit the exterior tubular portion to translate along or parallel to the transmission axis within the drive part housing prior to formation of the joining connection.

2. The adjustment drive of claim 1, wherein the drive part housing comprises, in a region of the drive wheel, and the transmission part housing comprises, in a region of the transmission wheel, an open engagement region, wherein the drive wheel and the transmission wheel are in operative engagement with one another through the engagement region.

3. The adjustment drive of claim 1, wherein an interior of the drive part housing has an at least partially tubular shape that corresponds to the exterior tubular portion of the transmission part.

4. The adjustment drive of claim 1, wherein the joining connection comprises a form-fitting and/or force-fitting and/or integrally bonded connection.

5. The adjustment drive of claim 1, wherein the drive wheel is coupled coaxially to the motor shaft of an actuating motor, and the transmission wheel is connected to a threaded spindle or a spindle nut.

6. The adjustment drive of claim 5, wherein the actuating motor is attached to the drive part housing.

7. The adjustment drive of claim 1, wherein the drive axis and the transmission axis are perpendicular to one another and have a distance from one another which is determined by the axis distance between drive wheel and transmission wheel in operative engagement.

8. The adjustment drive of claim 1, wherein the drive wheel is a worm and the transmission wheel is a worm wheel.

9. The adjustment drive of claim 1 wherein the joining connection is an ultrasonic weld.

10. The adjustment drive of claim 1 wherein the joining connection comprises caulking.

11. The adjustment drive of claim 1 wherein an embossment of the drive part housing projects inwardly and engages in a form-fitting manner in a corresponding cutout in an outer side of the transmission part housing.

12. The adjustment device of claim 1 wherein a portion of the drive part housing that partially surrounds the exterior tubular portion of the transmission part housing is tubular and has an inner radius that is greater than an outer radius of the exterior tubular portion of the transmission part housing.

13. The adjustment device of claim 1 wherein an entirety of a portion of the drive part housing that contacts the exterior tubular portion of the transmission part housing is semi-annular and is not completely annular.

14. The adjustment device of claim 1 wherein the exterior tubular portion of the transmission part housing is disposed partially within a semi-circular void formed by the drive part housing, wherein the transmission axis extends through the semi-circular void of the drive part housing.

15. A drive unit for an adjustment drive, comprising:
a transmission in which there is mounted a drive wheel which when driven rotates about a drive axis and
a transmission wheel in operative engagement with the drive wheel; the transmission wheel rotatably mounted in the transmission about a transmission axis,
wherein the transmission is composed of a drive module, which comprises the drive wheel, and of a transmission module, which comprises the transmission wheel, wherein the drive module and the transmission module are connected to one another by a joining connection that is non-releasable,
wherein the drive module comprises a drive part housing in which the drive wheel is mounted, wherein the transmission module comprises a transmission part housing in which the transmission wheel is mounted, wherein the drive part housing is connected to the transmission part housing via the joining connection,
wherein the transmission part housing comprises an exterior tubular portion that is coaxial to the transmission axis and that is partially surrounded by the drive part housing,
wherein the drive part housing and the exterior tubular portion of the transmission part housing are sized and shaped to permit the exterior tubular portion to translate along or parallel to the transmission axis within the drive part housing prior to formation of the joining connection.

16. The drive unit of claim 15 wherein a portion of the drive part housing that partially surrounds the exterior tubular portion of the transmission part housing is tubular and has an inner radius that is greater than an outer radius of the exterior tubular portion of the transmission part housing.

17. The drive unit of claim 15 wherein the exterior tubular portion of the transmission part housing is disposed partially within a semi-circular void formed by the drive part housing, wherein the transmission axis extends through the semi-circular void of the drive part housing.

18. A motor-adjustable steering column for a motor vehicle, comprising:
a carrying unit which is configured to attach to a vehicle body;
an actuating unit held by the carrying unit;
a steering spindle rotatably mounted in the actuating unit about a longitudinal axis; and
an adjustment drive which is connected to the carrying unit and to the actuating unit and by which the actuating unit is adjustable relative to the carrying unit;
wherein the adjustment drive comprises:
a threaded spindle that engages in a spindle nut; and
a drive unit having a transmission in which there is mounted a drive wheel which when driven rotates about a drive axis and which is in operative engagement with a transmission wheel which is rotatably mounted in the transmission about a transmission axis and is connected to the threaded spindle or the spindle nut;
wherein the transmission is composed of a drive module, which comprises the drive wheel, and of a transmission module, which comprises the transmission wheel, wherein the drive module and the transmission module are connected to one another by a joining connection that is non-releasable,
wherein the drive module comprises a drive part housing in which the drive wheel is mounted, wherein the transmission module comprises a transmission part housing in which the transmission wheel is mounted, wherein the drive part housing is connected to the transmission part housing via the joining connection,
wherein the transmission part housing comprises an exterior tubular portion that is coaxial to the transmission axis and that is partially surrounded by the drive part housing,
wherein the drive part housing and the exterior tubular portion of the transmission part housing are sized and shaped to permit the exterior tubular portion to translate along or parallel to the transmission axis within the drive part housing prior to formation of the joining connection.

19. The motor-adjustable steering column of claim 18 wherein a portion of the drive part housing that partially surrounds the exterior tubular portion of the transmission part housing is tubular and has an inner radius that is greater than an outer radius of the exterior tubular portion of the transmission part housing.

20. The motor-adjustable steering column of claim 18 wherein the exterior tubular portion of the transmission part housing is disposed partially within a semi-circular void formed by the drive part housing, wherein the transmission axis extends through the semi-circular void of the drive part housing.

\* \* \* \* \*